(12) United States Patent
Lu (10) Patent No.: US 10,161,357 B2
(45) Date of Patent: Dec. 25, 2018

(54) ACOUSTICALLY TREATED THRUST REVERSER TRACK BEAM

(71) Applicant: ROHR, INC., Chula Vista, CA (US)

(72) Inventor: Jacques Lu, Murrieta, CA (US)

(73) Assignee: ROHR, INC., Chula Vista, CA (US)

( * ) Notice: Subject to any disclaimer, the term of this patent is extended or adjusted under 35 U.S.C. 154(b) by 605 days.

(21) Appl. No.: 15/186,150

(22) Filed: Jun. 17, 2016

(65) Prior Publication Data

US 2017/0363042 A1 Dec. 21, 2017

(51) Int. Cl.
| F02C 7/04 | (2006.01) |
| F02K 1/56 | (2006.01) |
| F02K 1/82 | (2006.01) |
| F02C 7/045 | (2006.01) |
| F02K 1/64 | (2006.01) |
| F02K 1/72 | (2006.01) |

(52) U.S. Cl.
CPC .............. *F02K 1/56* (2013.01); *F02C 7/045* (2013.01); *F02K 1/64* (2013.01); *F02K 1/72* (2013.01); *F02K 1/827* (2013.01); *F05D 2260/96* (2013.01); *F05D 2260/963* (2013.01)

(58) Field of Classification Search
CPC ... F02K 1/827; F02K 1/70; F02K 1/72; F02K 1/64; F02K 1/54; F02K 1/56; F02C 7/04
See application file for complete search history.

(56) References Cited

U.S. PATENT DOCUMENTS

| 3,890,060 | A | 6/1975 | Lipstein |
| 3,913,702 | A | 10/1975 | Wirt |
| 4,509,616 | A | 4/1985 | Blecherman |
| 4,858,721 | A | 8/1989 | Autie |
| 5,806,302 | A | 9/1998 | Cariola |
| 5,927,647 | A * | 7/1999 | Masters .................. F02K 1/72 239/265.19 |
| 6,557,799 | B1 | 5/2003 | Sternberger |
| 8,820,088 | B2 | 9/2014 | Gilson |
| 9,168,716 | B2 | 10/2015 | Benedetti |
| 2006/0043236 | A1 | 3/2006 | Campbell |
| 2007/0294996 | A1 | 12/2007 | Stephan et al. |
| 2008/0295518 | A1 | 12/2008 | Reba |
| 2009/0297357 | A1 | 12/2009 | Ali |
| 2009/0321178 | A1 * | 12/2009 | Durchholz ............. F02C 7/045 181/141 |
| 2011/0133025 | A1 | 6/2011 | Vauchel |
| 2012/0097761 | A1 | 4/2012 | Vache |
| 2012/0248284 | A1 | 10/2012 | Bellanger et al. |
| 2013/0161415 | A1 | 6/2013 | Aircelle |

(Continued)

FOREIGN PATENT DOCUMENTS

GB 1369434 10/1974

OTHER PUBLICATIONS

Extended European Search Report dated Mar. 6, 2015 in European Application No. 14189824.7.

(Continued)

*Primary Examiner* — Steven Sutherland
(74) *Attorney, Agent, or Firm* — Snell & Wilmer L.L.P.

(57) ABSTRACT

A thrust reverser track beam may comprise a noise suppressing structure. The noise suppressing structure may form the airflow surface of the track beam. The noise suppressing structure may be riveted, bolted, or bonded to the track beam.

19 Claims, 8 Drawing Sheets

(56) References Cited

U.S. PATENT DOCUMENTS

| | | | | |
|---|---|---|---|---|
| 2015/0041059 A1* | 2/2015 | Olson | ................ | F02K 1/56 |
| | | | | 156/308.6 |
| 2015/0108250 A1* | 4/2015 | Aten | ................ | B64D 29/06 |
| | | | | 239/265.19 |
| 2015/0136875 A1* | 5/2015 | Lacko | ................ | F02C 7/20 |
| | | | | 239/265.19 |

OTHER PUBLICATIONS

USPTO; Non-Final Office Action dated Apr. 29, 2016 in U.S. Appl. No. 14/061,469.

* cited by examiner

ACOUSTICALLY TREATED THRUST REVERSER TRACK BEAM

FIELD

The present disclosure relates to jet aircraft, and more particularly, to noise suppression systems for jet aircraft.

BACKGROUND

Jet aircraft typically include turbofan propulsion systems (or "jet engines"), such as those that power modern commercial aircraft, and typically include a nacelle with a thrust reversing structure. These structures often include a translating sleeve configured to expose a cascade during a thrust reversing operation. The translating sleeve typically translates on two track beams, one at approximately the twelve o'clock position, and another at approximately the six o'clock position. Portions of the track beam are exposed to the air flow inside of the thrust reverser duct, and form a part of the aerodynamic surface of the duct. It may be desirable in some thrust reverser designs to include a noise attenuation feature on one or more of the track beams in order to further attenuate noise in the duct.

SUMMARY

A thrust reverser may comprise a track beam and a noise suppressing structure coupled to the track beam, wherein the noise suppressing structure comprises a forward close out.

In various embodiments, the noise suppressing structure may extend circumferentially from a bifurcation panel of the thrust reverser to a cascade. The noise suppressing structure may extend longitudinally from a forward end of the track beam to an aft end of the track beam. The noise suppressing structure may forma an entire airflow surface of the track beam within a bypass air duct of the thrust reverser. The noise suppressing structure may comprise a lateral close out. A backskin of the noise suppressing structure may be riveted to the track beam. The noise suppressing structure may be coupled to the track beam via a bolt. The bolt may extend through a dense core region of the noise suppressing structure.

A thrust reverser track beam may comprise an elongate member having at least one track, the at least one track configured to receive a housing capable of translating forward and aft along the elongate member; a noise suppressing structure coupled to the elongate member, the noise suppressing structure forming an entire airflow surface of the track beam within a bypass air duct; and a cascade array configured to direct airflow during a reverse thrust mode, the housing translating forward to cover the cascade array in a stowed configuration and translating aft to expose the cascade array in a deployed configuration.

In various embodiments, the thrust reverser track beam may comprise a rivet coupling a backskin of the noise suppressing structure to the elongate member. The noise suppressing structure may comprise a forward close out and a lateral close out. The noise suppressing structure may extend from a forward end of the track beam to an aft end of the track beam. The noise suppressing structure may comprise a perforated top skin, a core, and a backskin. The noise suppressing structure may be coupled to the track beam via a bolt extending through a dense core region of the core.

A nacelle may comprise a track beam; and a noise suppressing panel coupled to the track beam, wherein the noise suppressing panel forms an entire airflow surface of the track beam.

In various embodiments, the noise suppressing panel may extend circumferentially from a bifurcation panel of an inner fixed structure to a cascade. The noise suppressing panel may extend longitudinally from a forward end of the track beam to an aft end of the track beam. A rivet may couple a buckskin of the noise suppressing structure to the track beam. The noise suppressing structure may be coupled to the track beam via a bolt extending through a dense core region of the noise suppressing structure.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight or motion.

Figure 1A:
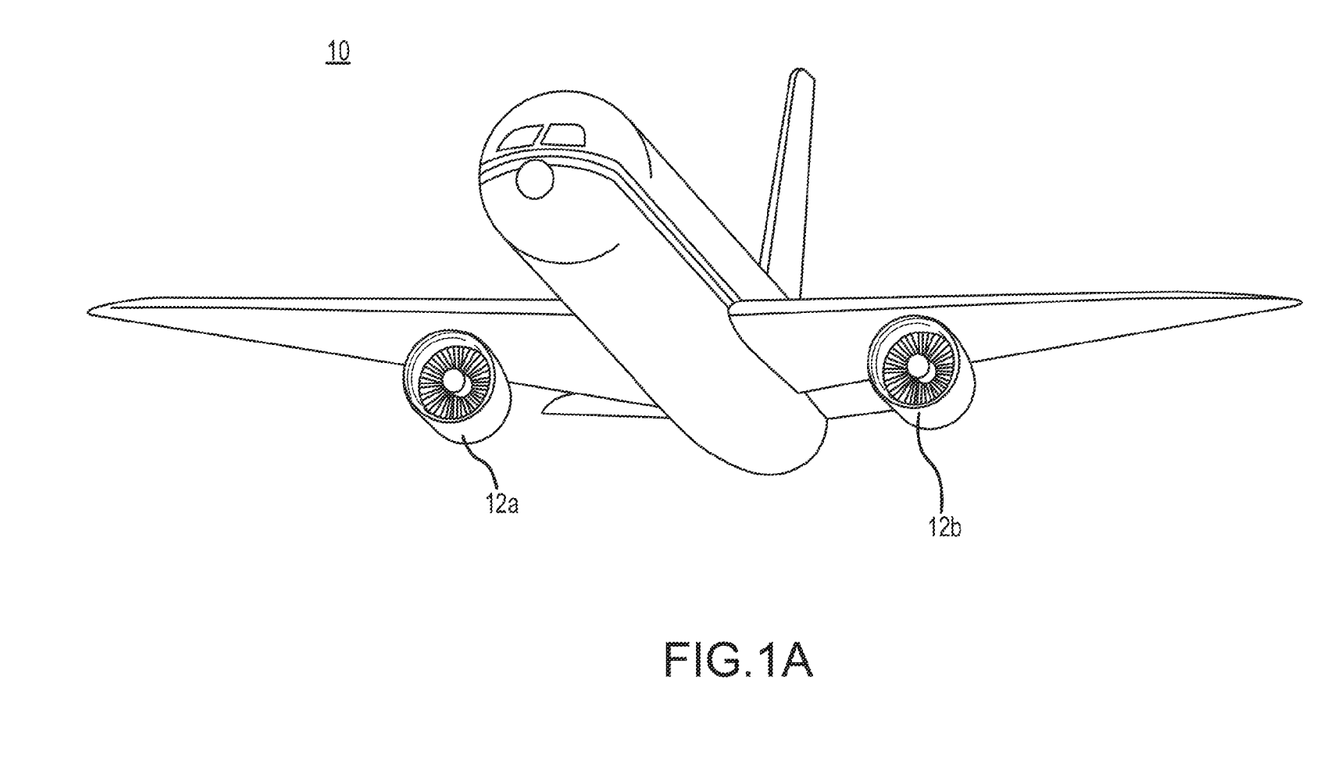
FIG. 1A illustrates, in accordance with various embodiments, a perspective view of an aircraft having a turbofan propulsion system.
Figure 1B:
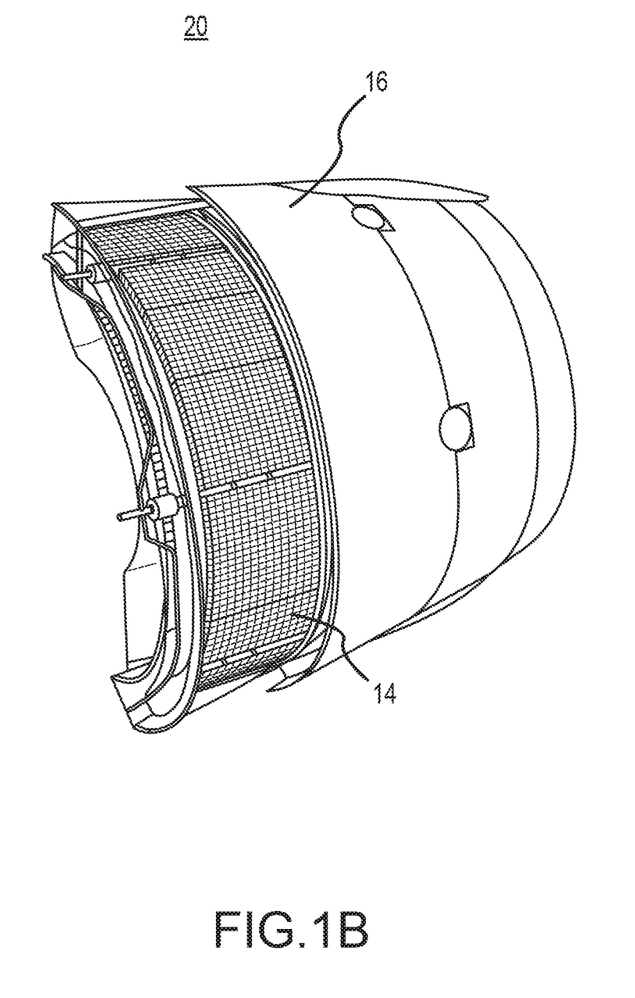
FIG. 1B illustrates, in accordance with various embodiments, a perspective view of a thrust reversing assembly of a turbofan propulsion system.

Referring to FIGS. 1A and 1B, jet aircraft, such as jet aircraft 10, typically include one or more jet engines 12a and 12b. These jet engines 12a and 12b typically include a nacelle comprising a thrust reversing structure or assembly 20 (or simply a thrust reverser). The thrust reverser includes a cascade 14 as well as a translating sleeve 16. The cascade 14 comprises a plurality of vents that redirect airflow during certain operations (e.g., landing) to generate reverse thrust. The translating sleeve 16 comprises a tapering generally cylindrical or partially semi-cylindrical structure. The translating sleeve 16 may be disposed about the cascade 14 in a stowed position. The translating sleeve 16 may translate from a forward position to a more aft position during deployment (i.e., engagement of the thrust reverser) to expose the cascade 14. Thus, during flight, a cascade 14 may be stowed or enclosed within a translating sleeve 16 to prevent reverse thrust. During landing, the translating sleeve 16 may translate aft to expose the cascade 14.

The translating sleeve 16 may be mounted on one or more track beams. These track beams may include one or more tracks or grooves, and the translating sleeve 16 may be coupled (e.g., as through a tongue-in-groove structure) to each of the track beams. The translating sleeve 16 may thus translate relative to the track beam along these grooves.

Figure 2A:
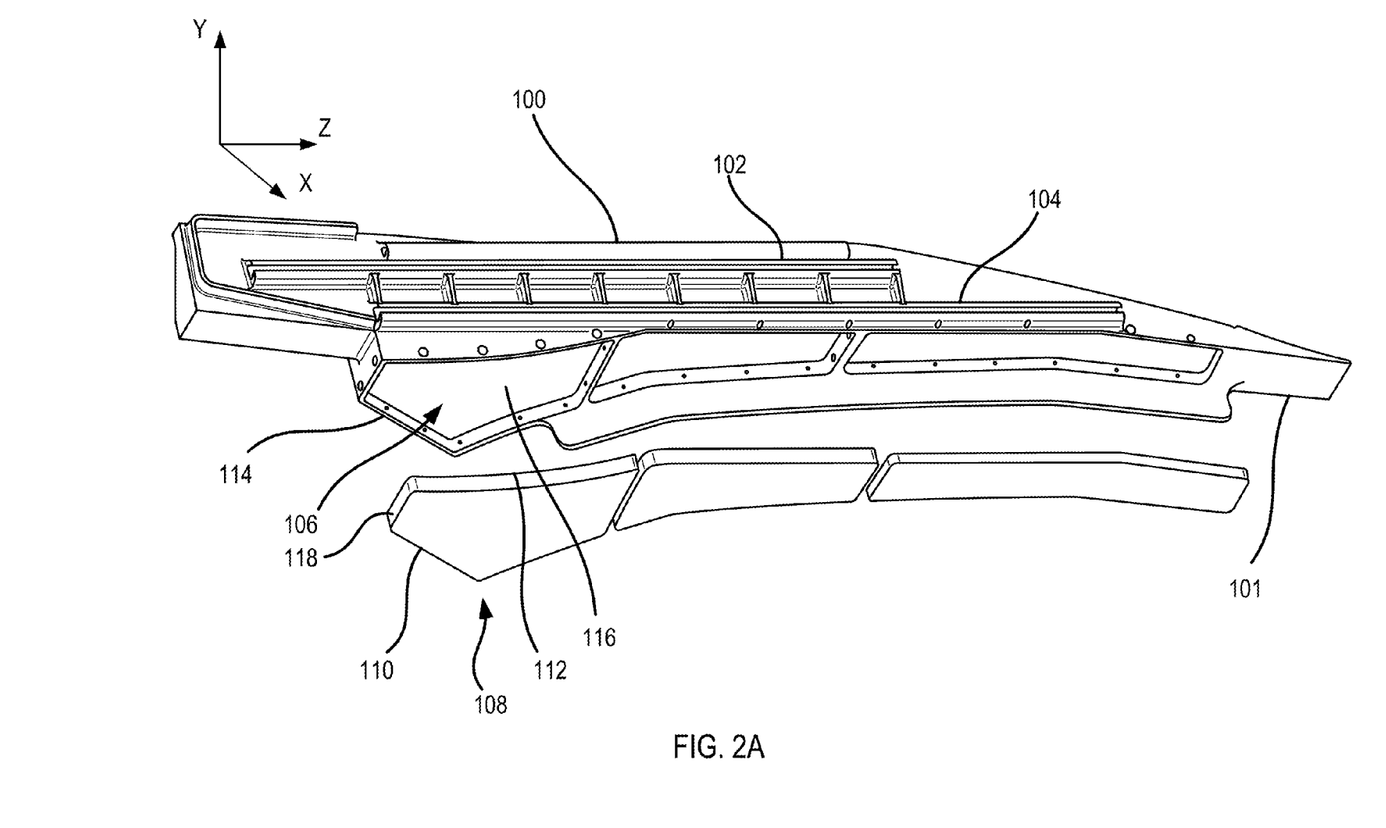
FIG. 2A illustrates, in accordance with various embodiments, a first side perspective view of a track beam of a turbofan propulsion system.

Referring to FIG. 2A, a perspective view of a first side of a track beam 100 is illustrated according to various embodiments. The track beam 100 may comprise one or more channels or grooves 102 and 104. As described above, a translating sleeve may be coupled to the track beam 100, and the translating sleeve may translate in forward and aft directions along grooves 102 and 104. In particular, the translating sleeve may translate aft to expose a cascade. In addition, the translating sleeve may translate forward to cover or enclose a cascade.

In various embodiments, one or more recesses 106 (such as a cavity and/or pocket) may be formed in a portion of, or the entire bottom face of, a generally lateral reception surface 101 of the track beam 100. The recesses 106 may be defined by a perimeter 114 and a reception surface 116. The reception surface 116 may extend parallel to the plane defined, as shown, by the z-axis and the x-axis. The perimeter 114 may extend away from the surface 116 along the plane defined by the z-axis and the y-axis. The recesses 106 may comprise any of a plurality of shapes and depths. For example, as shown, the recesses 106 may comprise a generally triangular shape. The recesses 106 may be shaped, in addition, to conform to a shape of a track beam 100. Thus, as the track beam 100 may generally taper from forward to aft, the recesses 106 may likewise taper from forward to aft. Likewise, the surface 116 of the recess 106 may taper from a first depth to a second depth.

One or more noise suppressing structures 108 may be coupled to the track beam 100. In various embodiments, the noise suppressing structure 108 may be inserted into recess 106 and coupled to track beam 100 within recess 106. The noise suppressing structure 108 may comprise, in various embodiments, any suitable structure for the suppression of noise.

For example, the noise suppressing structure 108 may comprise a latticework of hexagonal (or other shape) cells. Each cell comprising the latticework may comprise a perforated top sheet 110 and an optional non-perforated backskin 112. Cells may be configured to cancel and/or suppress sound waves of various wavelengths in a known manner by reflecting/omitting sound waves out of the cell which are out of phase with incoming waves for destructive interference. The depth of a cell may extend along the y axis. The depth and other dimensions of each cell may be configured in accordance with the sound wave length that is desired to be canceled and/or suppressed. Of course, the noise suppressing structure 108 may comprise a bulk absorber such as an open celled foam and/or the like, or other types of sound suppressing or attenuating features.

The noise suppressing structure 108 may comprise a volume defined by the top sheet 110, the backskin 112 and a perimeter 118. The top sheet 110 and the backskin 112 may extend generally parallel to one another. For example, the top sheet 110 may extend parallel to a first plane defined by the z-axis and the x-axis. The backskin 112 may extend parallel to a second plane defined by the z-axis and the x-axis. The perimeter 118 may extend between the top sheet 110 and the backskin 112 and extend substantially perpendicular to the faces, for example, along the y axis. In various embodiments, the noise suppressing structure 108 may not comprise a backskin 112, and a surface of the track beam 100 together with the top sheet 110 and the core may define the cells.

The noise suppressing structure 108 may comprise any shape suitable for insertion within the recess 106. For example, the noise suppressing structure may comprise a generally triangular shape.

The noise suppressing structure 108 may be coupled to the track beam 100 by any suitable structure. For example, the noise suppressing structure 108 may be coupled within the recess by way of one or more rivets, one or more screws, one or more bolts and/or nuts, by way of an adhesive, by way of pressure fitting, by way of heat bonding, and the like.

Figure 2B:
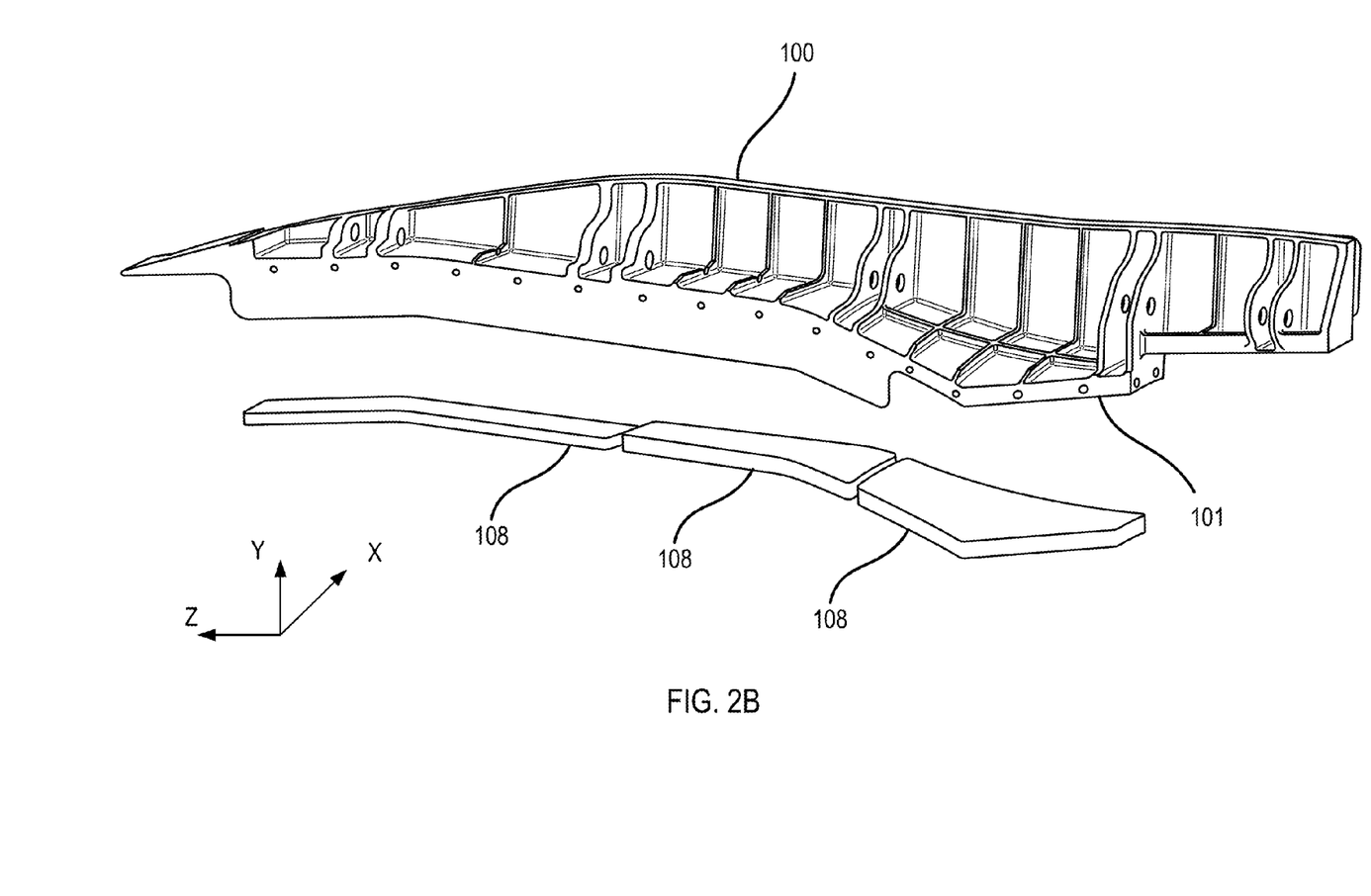
FIG. 2B illustrates, in accordance with various embodiments, a second side perspective view of a track beam of a turbofan propulsion system.

Referring to FIG. 2B, a second perspective view of the track beam 100 is shown. This second perspective view shows the track beam 100 from a perspective that is radially opposite the view depicted in FIG. 2A. That is, the second perspective view shows the track beam 100 from the vantage point of the negative z-axis. As shown, the noise suppressing structure 108 may be coupled to the track beam 100.

Thus, as described herein, a track beam 100 may be formed or constructed such that the track beam 100 includes one or more noise suppressing structures 108. The noise suppressing structure 108 may be further coupled to the generally lateral reception surface 101 of the track beam 100. The noise suppressing structures 108 may suppress and/or cancel noise generated by the engine and/or the aircraft itself. Thus, overall, noise generated by the aircraft and/or aircraft engine may be further muffled or suppressed for quieter aircraft and/or aircraft engine operation. In various embodiments, the track beam 100 may comprise any suitable number and shape of recesses that may comprise noise suppressing structures inserted within the recesses.

Figure 3:
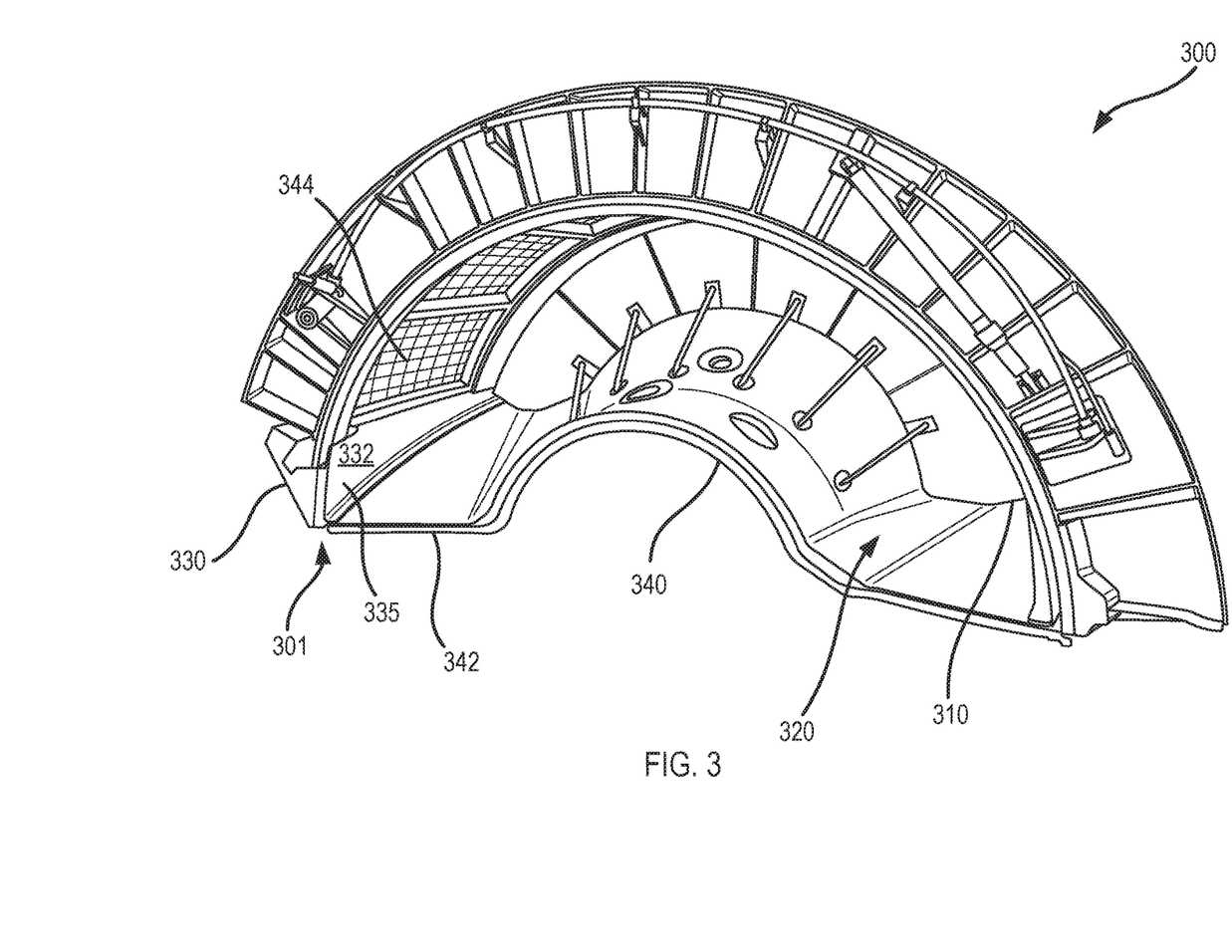
FIG. 3 illustrates, in accordance with various embodiments, a perspective view of an interior of a thrust reverser half.

Referring to FIG. 3, a perspective view of one-half of the interior of a thrust reverser 300 is illustrated according to various embodiments. The thrust reverser 300 is shown in a deployed position, with one or more blocker doors 310 deployed within a bypass air duct 320. The view illustrates how a track beam 330 forms a portion of an airflow surface 335 within the bypass air duct 320. The track beam 330 may comprise a noise suppressing structure 332. In various embodiments, the noise suppressing structure 332 may cover approximately the entire airflow surface 335 of the track beam 330, such that the noise suppressing structure 332 is the only portion of the track beam 330 in contact with air passing through the bypass air duct 320 during normal flight operation. Thus, the noise suppressing structure 332 may extend longitudinally from a forward edge 301 of the thrust reverser 300 to an aft edge of the thrust reverser 300. Similarly, the noise suppressing structure 332 may extend circumferentially from a bifurcation panel 342 of the inner fixed structure ("IFS") 340 to a cascade 344.

Figure 4:
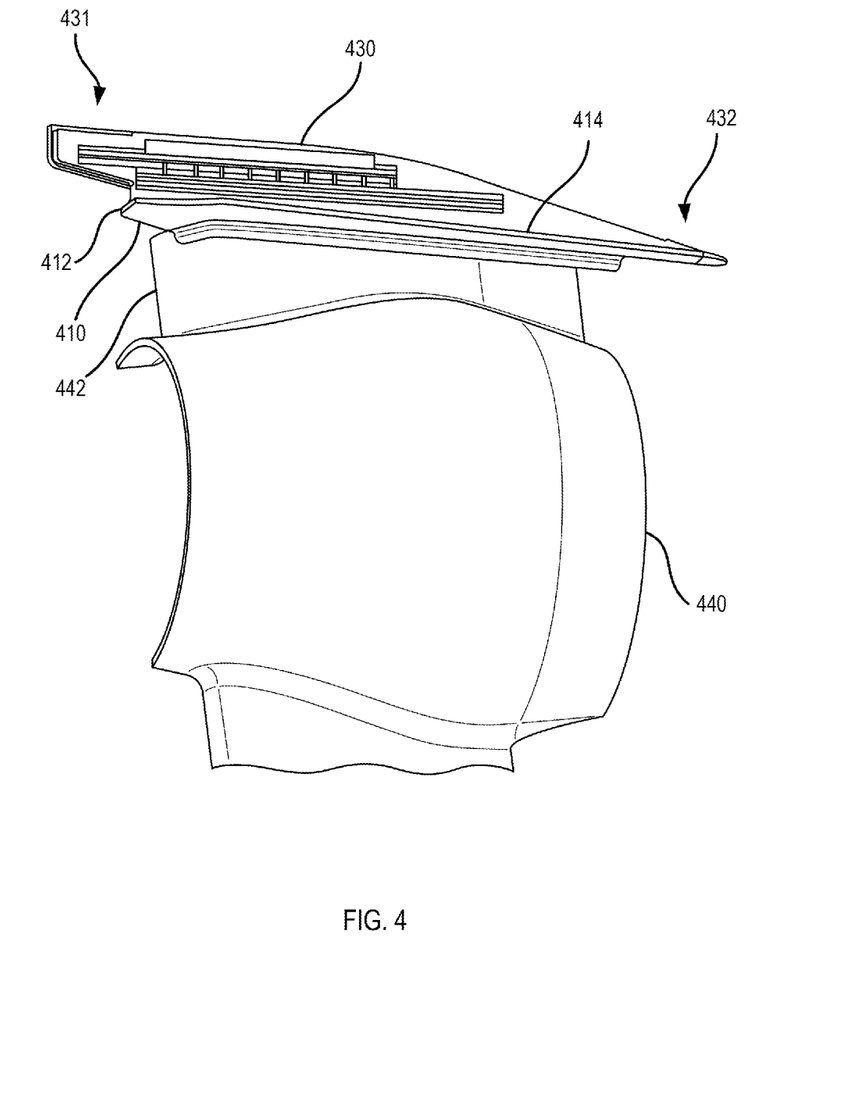
FIG. 4 illustrates, in accordance with various embodiments, a perspective view of an inner fixed structure coupled to a track beam.

Referring to FIG. 4, a perspective view of an IFS 440 coupled to a track beam 430 is illustrated according to various embodiments. A noise suppressing panel 410 may be coupled to the track beam 430. The track beam 430 may be coupled to a bifurcation panel 442 of the IFS 440. A noise suppressing panel 410 may extend from a forward end 431 of the track beam 430 to an aft end 432 of the track beam 430. The noise suppressing panel 410 may comprise a forward close out surface 412 and a lateral close out surface 414. In various embodiments, the close out surfaces 412, 414 may comprise a solid sheet of aluminum or composite material. Thus, as opposed to the recessed noise suppressing panel described with reference to FIGS. 2A-2B, the noise suppressing panel 410 may be coupled to the track beam 430 without using a "pocket" in the track beam 430, and the forward close out surface 412 may form a forward-most portion of the track beam 430 in a local area of the noise suppressing panel 410.

Referring to FIG. 4, a perspective view of an IFS 440 coupled to a track beam 430 is illustrated according to various embodiments. A noise suppressing panel 410 may be coupled to the track beam 430. The track beam 430 may be coupled to the bifurcation panel 442 of the IFS 440. The noise suppressing panel 410 may extend from a forward end 431 of the track beam 430 to an aft end 432 of the track beam 430. The noise suppressing panel 410 may comprise a forward close out surface 412 and a lateral close out surface 414. In various embodiments, the close out surfaces 412, 414 may comprise a solid sheet of aluminum or composite material. Thus, as opposed to the recessed noise suppressing panel described with reference to FIGS. 2A-2B, the noise suppressing panel 410 may be coupled to the track beam 430 without using a "pocket" in the track beam 430, and the forward close out surface 412 may form the forward-most portion of the track beam 430 in the local area of the noise suppressing panel 410.

Figure 5:
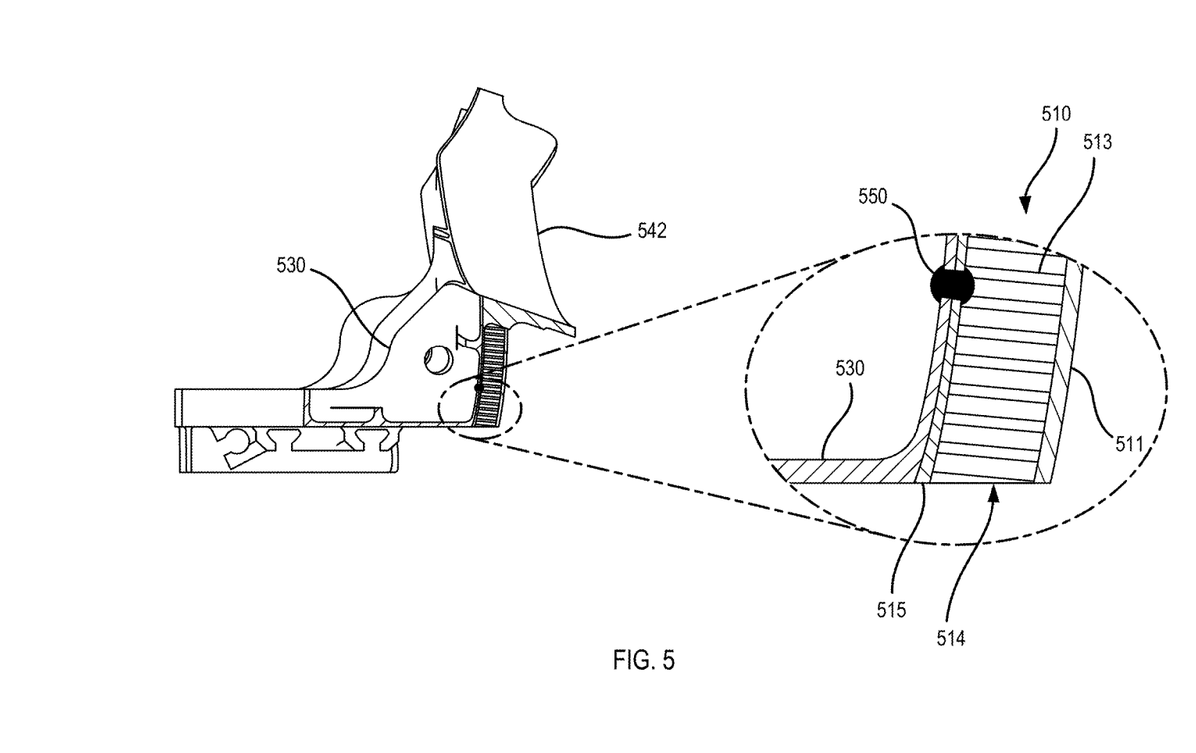
FIG. 5 illustrates, in accordance with various embodiments, a section view of a track beam with a noise suppression panel.

Referring to FIG. 5, a section view of a track beam top 530 with a noise suppression panel 510 is illustrated according to various embodiments. The track beam top 530 may be coupled to the track beam bottom 542. A noise suppression panel 510 may be coupled to the track beam top 530 and the track beam bottom 542. The noise suppression panel 510 may comprise a perforated top sheet 511, a core 513, and an optional backskin 515. The noise suppression panel 510 may comprise a close out surface 514. Because the close out surface 514 at the side of the noise suppression panel 510 may be exposed to air flow, the close out surface 514 may provide a smooth, closed out surface to reduce drag, forming flush continuations of adjacent surfaces without steps and gaps. In various embodiments, the noise suppression panel 510 may be coupled to the track beam top 530 using rivets 550 which extend through the backskin 515 and the track beam top 530. In various embodiments, the backskin 515 may comprise aluminum to provide sufficient strength for attachment via blind rivets 550 that don't penetrate to the top skin. In various embodiments, the backskin 515 may comprise a composite material, and the backskin 515 may comprise a greater number of plies in the area of the rivets 550 to provide additional strength to the composite material, as compared to regions of the backskin 515 which are not adjacent to the rivets 550. In various embodiments, the backskin 515 may be welded or bonded to the track beam top 530 using an adhesive. By using rivets 550 and/or bonding/welding to couple the backskin 515 to the track beam top 530, a greater area of the perforated top sheet 511 and core 513 may be utilized for noise suppression.

Figure 6:
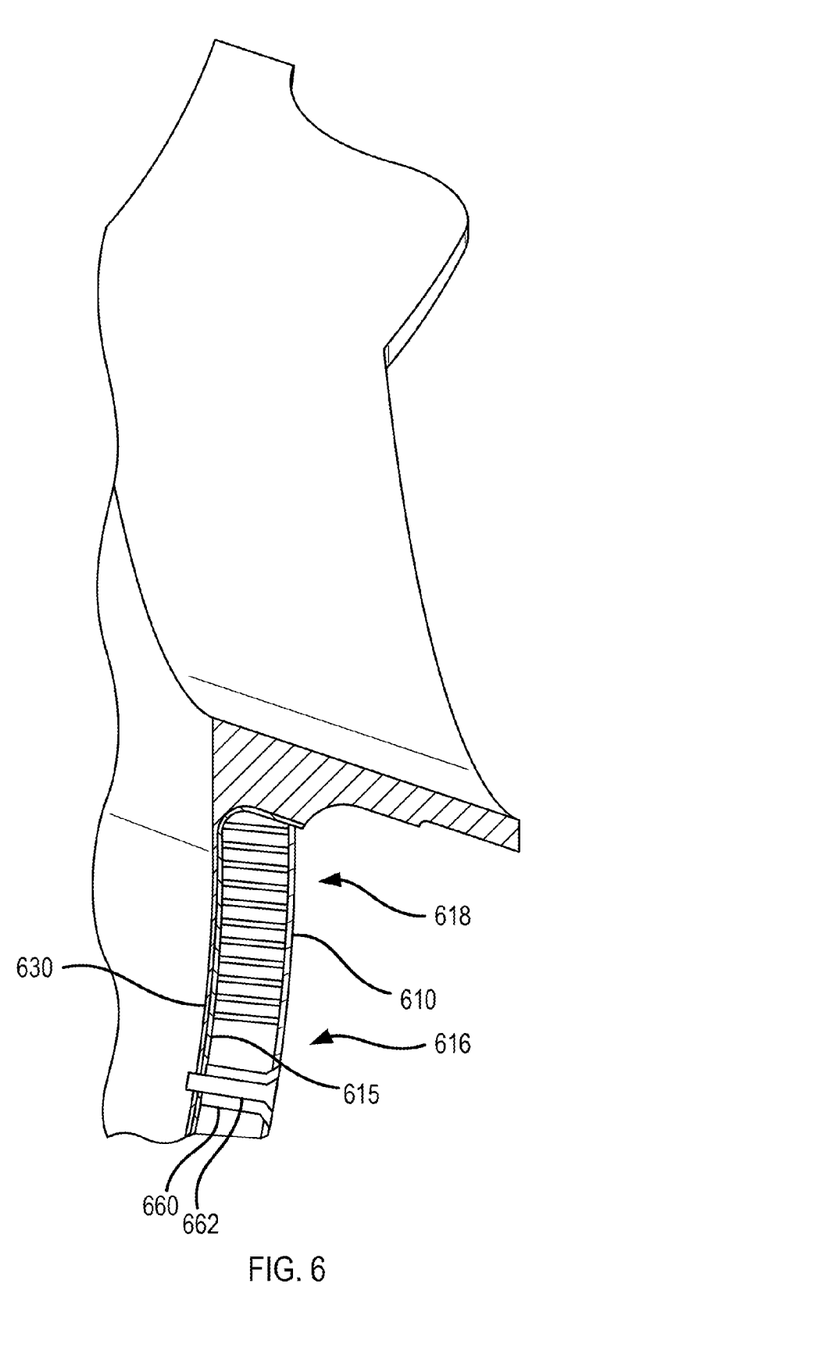
FIG. 6 illustrates, in accordance with various embodiments, a section view of a track beam with a noise suppression panel bolted to the track beam.

Referring to FIG. 6, a section view of a track beam 630 with a noise suppression panel 610 bolted to the track beam 630 is illustrated according to various embodiments. The noise suppression panel 610 may comprise a dense core region 616. The dense core region 616 may comprise cells with smaller volume than in the acoustic region 618 of the core 613, such that a greater amount of core material supports the noise suppression panel 610 in the dense core region 616. A spacer 660 may be inserted through the dense core region 616. A bolt 662 may be inserted through the spacer 660, the backskin 615, and the track beam 630. Thus, the noise suppression panel 610 may be coupled to the track beam 630 without relying on the strength of the backskin 615. For example, in noise suppression panels with a thin composite backskin of limited strength, bolts may be inserted through dense core regions to couple the noise suppression panel to the track beam. However, the noise suppression qualities of the noise suppression panel 610 may be reduced in the region of the bolt 662 and/or the dense core region 616.

Although primarily shown with reference to a hinge beam in a thrust reverser, the noise suppression panels described herein may be applied to both hinge beams and latch beams in thrust reversers to increase the amount of noise suppression capability in a nacelle.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A thrust reverser, comprising:
   a track beam tapered from forward to aft; and
   a noise suppressing structure coupled to the track beam, wherein the noise suppressing structure comprises a closed surface on at least one forward edge; and
   wherein the noise suppressing structure forms an entire airflow surface of the track beam within a bypass air duct of the thrust reverser, the noise suppressing structure being an only portion of the track beam in contact with air passing through the bypass air duct.

2. The thrust reverser of claim 1, wherein the noise suppressing structure extends circumferentially from a bifurcation panel of the thrust reverser to a cascade.

3. The thrust reverser of claim 1, wherein the noise suppressing structure extends longitudinally from a forward end of the track beam to an aft end of the track beam.

4. The thrust reverser of claim 1, wherein the noise suppressing structure comprises a lateral closed surface.

5. The thrust reverser of claim 1, wherein a backskin of the noise suppressing structure is riveted to the track beam.

6. The thrust reverser of claim 1, wherein the noise suppressing structure is coupled to the track beam via a bolt.

7. The thrust reverser of claim 6, wherein the bolt extends through a first region of the noise suppressing structure comprising cells having a smaller volume and greater density than in a second region of the noise suppressing structure.

8. A thrust reverser track beam tapered from forward to aft, comprising:
   an elongate member having at least one track, the at least one track configured to receive a housing capable of translating forward and aft along the elongate member;
   a noise suppressing structure coupled to the elongate member, the noise suppressing structure forming an entire airflow surface of the tapered thrust reverser track beam within a bypass air duct, the noise suppressing structure being an only portion of the thrust reverser track beam in contact with air passing through the bypass air duct; and
   a cascade configured to direct airflow during a reverse thrust mode, the housing translating forward to cover the cascade in a stowed configuration and translating aft to expose the cascade in a deployed configuration.

9. The thrust reverser track beam of claim 8, further comprising a rivet coupling a backskin of the noise suppressing structure to the elongate member.

10. The thrust reverser track beam of claim 8, wherein the noise suppressing structure comprises a forward closed surface and a lateral closed surface.

11. The thrust reverser track beam of claim 8, wherein the noise suppressing structure extends circumferentially from a bifurcation panel of an inner fixed structure to the cascade.

12. The thrust reverser track beam of claim 8, wherein the noise suppressing structure extends from a forward end of the thrust reverser track beam to an aft end of the thrust reverser track beam.

13. The thrust reverser track beam of claim 8, wherein the noise suppressing structure comprises a perforated top skin, a core, and a backskin.

14. The thrust reverser track beam of claim 13, wherein the noise suppressing structure is coupled to the thrust reverser track beam via a bolt extending through a first region of the noise suppressing structure comprising cells having a smaller volume and greater density than in a second region of the noise suppressing structure.

15. A nacelle, comprising:
   a track beam tapered from forward to aft; and
   a noise suppressing panel coupled to the track beam, wherein the noise suppressing panel forms an entire airflow surface of the track beam, the noise suppressing panel being an only portion of the track beam in contact with air passing through a bypass air duct of the nacelle.

16. The nacelle of claim 15, wherein the noise suppressing panel extends circumferentially from a bifurcation panel of an inner fixed structure to a cascade.

17. The nacelle of claim 15, wherein the noise suppressing panel extends longitudinally from a forward end of the track beam to an aft end of the track beam.

18. The nacelle of claim 15, further comprising a rivet coupling a backskin of the noise suppressing panel to the track beam.

19. The nacelle of claim 15, wherein the noise suppressing panel is coupled to the track beam via a bolt extending through a first region of the noise suppressing panel comprising cells having a smaller volume and greater density than in a second region of the noise suppressing panel.

* * * * *